United States Patent
Kuck

Patent Number: 5,482,358
Date of Patent: Jan. 9, 1996

[54] VENTED PLUG FOR A HUBCAP

[75] Inventor: Scott M. Kuck, Lincoln, Nebr.

[73] Assignee: Dual Dynamics, Lincoln, Nebr.

[21] Appl. No.: 295,599

[22] Filed: Aug. 25, 1994

[51] Int. Cl.⁶ ................................................. B60B 7/00
[52] U.S. Cl. .................... 301/108.1; 301/108.3
[58] Field of Search .................... 301/108.1, 108.2, 301/108.3, 108.4

[56] References Cited

U.S. PATENT DOCUMENTS

| | | | |
|---|---|---|---|
| 2,576,610 | 11/1951 | Kunzog | 138/41 |
| 2,604,958 | 7/1952 | Leufvenius | 184/105 |
| 2,655,041 | 10/1953 | Jacobsson | 73/199 |
| 3,064,982 | 11/1962 | Stephens | 277/95 |
| 3,114,579 | 12/1963 | Isenbarger | 301/108.1 |
| 3,177,041 | 4/1965 | Isenbarger | 301/108.1 |
| 3,227,497 | 1/1966 | Heckethorn | 308/3.5 |
| 3,316,022 | 4/1967 | Isenbarger | 301/108 |
| 3,320,006 | 5/1967 | Cozzarin | 308/36.1 |
| 3,460,874 | 8/1969 | Johnson | 308/187.2 |
| 3,649,080 | 3/1972 | Molinare | 301/108.1 |
| 3,783,590 | 1/1974 | Allen | 55/310 |
| 3,927,576 | 12/1975 | Colletti | 74/498 |
| 4,073,540 | 2/1978 | Jackowski | 301/106 |
| 4,295,868 | 10/1981 | Hölter et al. | 55/302 |
| 4,687,579 | 8/1987 | Bergman | 210/347 |
| 4,723,529 | 2/1988 | Yokoi et al. | 123/573 |
| 4,732,594 | 3/1988 | Mizrah et al. | 55/523 |
| 4,744,386 | 5/1988 | Frazer | 137/315 |
| 4,820,950 | 4/1989 | Hijiya et al. | 310/90.5 |
| 4,990,054 | 2/1991 | Janocko | 415/111 |
| 5,066,071 | 11/1991 | Kinser | 301/108.2 |
| 5,071,457 | 12/1991 | Schmidt, Jr. et al. | 55/523 |
| 5,087,278 | 2/1992 | Suzuki | 55/523 |
| 5,192,117 | 3/1993 | Kuck | 301/108.1 |
| 5,195,807 | 3/1993 | Lederman | 301/108.1 |

Primary Examiner—Russell D. Stormer
Attorney, Agent, or Firm—Zarley, McKee, Thomte, Voorhees & Sease; Dennis L. Thomte

[57] ABSTRACT

A vented plug for a hubcap is disclosed and is comprised of a rubber, elastomer or Neophrene™ material having an insert molded therein with the insert being impervious to water and other contaminants so that water and other contaminants may not enter the interior of the hubcap but which permits the passage of air therethrough so that excessive pressure within the hubcap may be vented.

1 Claim, 3 Drawing Sheets

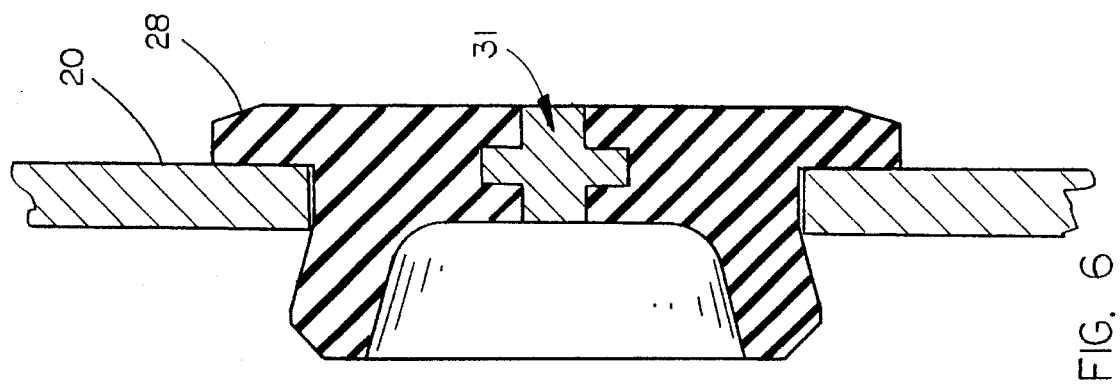
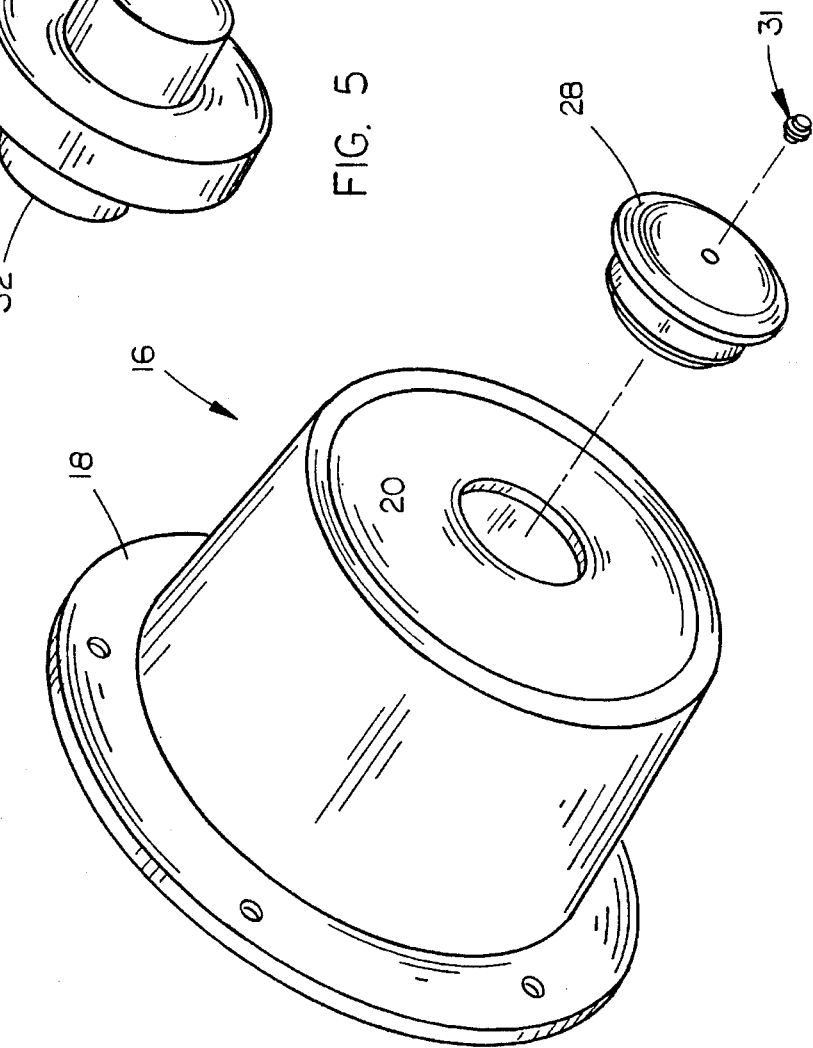

5,482,358

VENTED PLUG FOR A HUBCAP

BACKGROUND OF THE INVENTION

1. Field of the Invention

This invention relates to a hubcap and more particularly to a vented plug which may be inserted into a hubcap for use with automatic bearing lubrication systems.

2. Background Information

Hubcaps are used on wheels of many trucks and trailers to prevent contaminants from entering the wheel bearings and for maintaining the oil or grease in the bearings. In regent years, Dual Dynamics, Inc. of Lincoln, Nebr. has designed a hubcap having an automatic bearing lubrication system. The hubcap of Dual Dynamics, Inc. is known as a Dual-Guard™ hubcap and includes a hubcap which may be mounted on the studs of the truck or trailer wheel or threaded onto some types of axles. The interior of the Dual-Guard™ hubcap is filled with oil or grease so that the wheel bearings are lubricated. Heretofore, it has been necessary to provide a small vent opening in the Dual-Guard™ hubcap to permit the venting of excessive pressure within the hubcap as the bearings become heated. Although the vent openings work extremely well, they do pose a problem in certain situations. For example, in some dock loading situations, the wheels of the truck move downwardly into an excavated area adjacent the dock so that the bed of the truck will be level with the dock. In some cases, the excavated area adjacent the dock may be filled with water. Should the hubcaps of the truck wheels be submerged in the water, water and other contaminants may enter the interior of the hubcap through the vent opening. Further, water may enter the interior of the hubcap through the vent opening when the truck or trailer is power washed. The water and contaminants may dramatically shorten the life of the wheel bearings, hub and axle of the truck.

The problems associated with the prior art were solved by way of the disclosure in U.S. Pat. No. 5,192,117 wherein a hubcap is described which includes a vent opening having a plug positioned therein which is comprised of a bronze powder material cast into a cylindrical shape and press-fitted into the vent opening to permit the continuous passage of air therethrough to vent the wheel bearings but which prevented the passage of water and other contaminants therethrough.

In one form of a prior art hubcap, a Neophrene™ plug having a vent opening formed therein is used to seal the interior of the hubcap to prevent the escape of lubricant therefrom. While the vented Neophrene™ plug of the prior art does provide a convenient means for inserting lubricant into the hubcap, a contaminant such as water or the like may enter the interior of the hubcap through the vent opening in the plug.

It is therefore a principal object of the invention to provide an improved hubcap.

A further object of the invention is to provide a hubcap having a removable Neophrene™ plug including an insert (vent) molded therein which permits air to pass therethrough to vent the hubcap but which prevents water and other contaminants from passing therethrough.

It is a further object of the invention to provide a Neophrene™ plug for a prior art hubcap wherein the Neophrene™ plug has a metal insert molded therein which permits air to pass therethrough to vent the hubcap but which prevents water and other contaminants from passing therethrough.

These and other objects will be apparent to those skilled in the art.

SUMMARY OF THE INVENTION

A vented Neophrene™ or elastomer plug is provided for insertion in a hubcap designed to be used on a truck or trailer with the hubcap adapted to contain oil, grease or the like therein so that the bearings of the associated wheel are lubricated. In the removable plug of this invention, an insert is molded thereinto with the insert permitting air to pass therethrough but which prevents water and other contaminants from passing therethrough. Preferably, the insert is comprised of a sintered bronze material but other metal materials may also be employed.

BRIEF DESCRIPTION OF THE DRAWINGS

FIG. 4 is a perspective view of the removable Neophrene™ plug of this invention having the sintered bronze insert molded therein;

FIG. 5 is a perspective view of the insert;

FIG. 6 is a sectional view of the vented plug; and

DESCRIPTION OF THE PREFERRED EMBODIMENT

Figure 3:
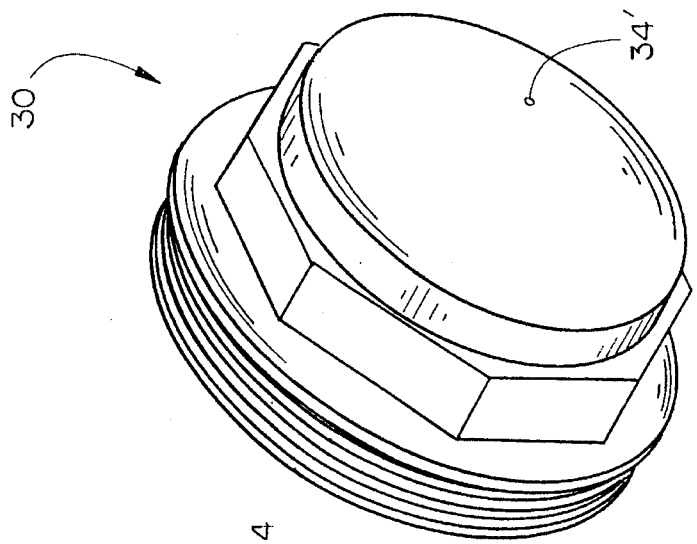
FIG. 3 is a perspective view of a prior art hubcap.
Figure 2:
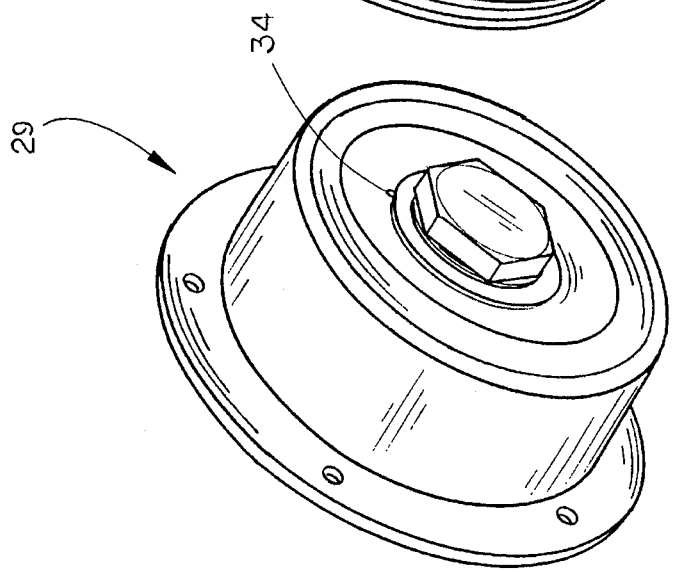
FIG. 2 is a perspective view of a prior art hubcap.
Figure 1:
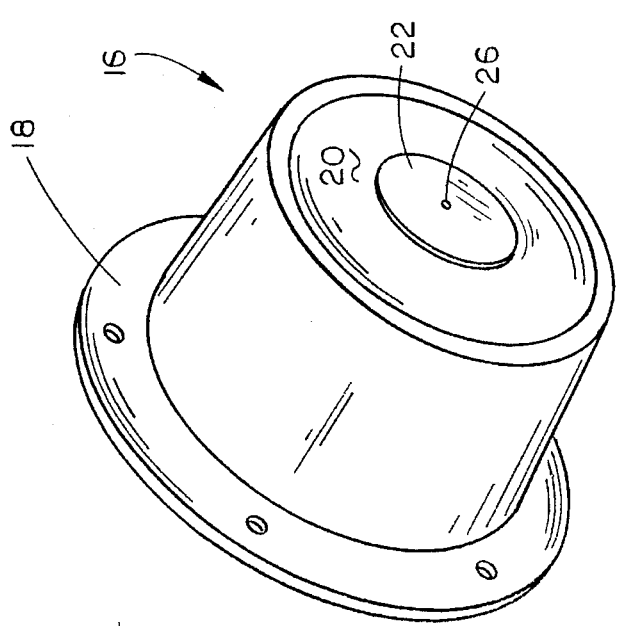
FIG. 1 is a perspective view of a prior art hubcap.
Figure 7:
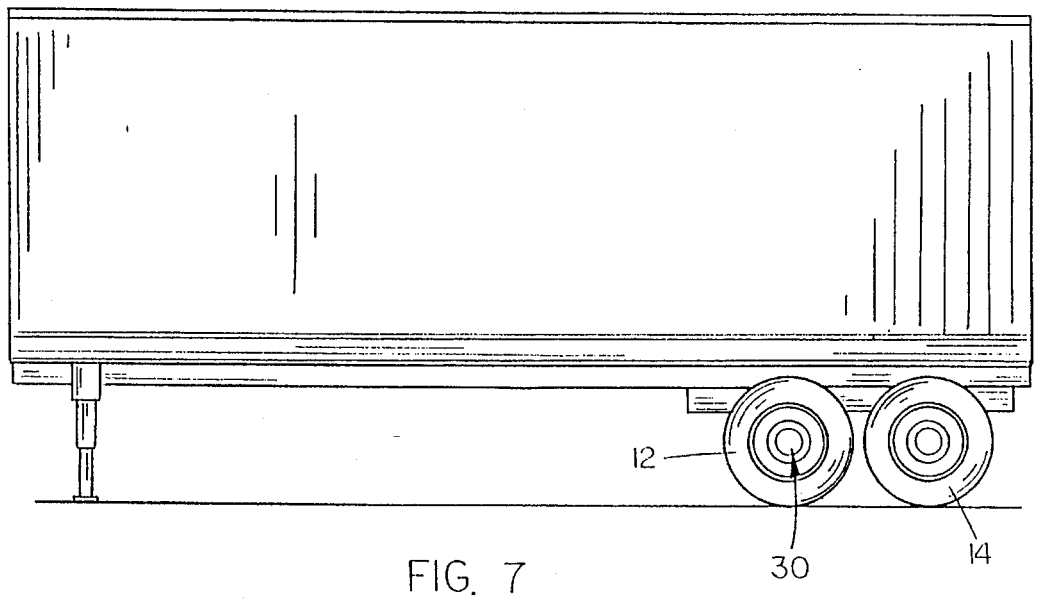
FIG. 7 is a side view of a conventional trailer.

In FIG. 7, the numeral 10 refers to a conventional trailer having wheels 12 and 14 at one side thereof. The wheels 12 and 14 include the conventional hubs, wheel bearings and axles. In FIGS. 1, 2 and 3, the numerals 16, 29 and 30 refer to prior art hubcaps which are mounted on the wheels to maintain oil and grease therein for the wheel bearings. The hubcaps 28 and 30 are the hubcaps disclosed in U.S. Pat. No. 5,192,117 as an improvement over the hubcap 16. The hubcaps 28 and 30 included vent openings 34 and 34' formed therein which had plugs positioned therein respectively comprised of a bronze powder material cast into a cylindrical shape and press-fitted into the vent openings to permit the continuous passage of air therethrough to vent the wheel bearings but which prevented the passage of water and other contaminants therethrough.

The invention disclosed herein is designed to be used in conjunction with the hubcap 16 illustrated in FIG. 1 wherein the hubcap 16 includes a mounting flange 18 for stud mounting on the wheel. The prior art hubcap 16 may also be of a threaded version to enable the same to be secured to Fruehauf Pro-Par™ axles. Hubcap 16 includes a sight glass 20 at the outer end thereof and a rubber, elastomer or Neophrene™ plug 22 which is removably mounted in an opening 24 in the sight glass 20. Plug 22 is normally removable from the sight glass 20 to permit oil cartridges or the like to be inserted into the interior of the hubcap so that the wheel bearings, hub and axle of the wheel may be lubricated. The plug 22 of the prior art hubcap 16 includes a small vent opening 26 provided therein to permit excessive pressure to be vented from the interior of the hubcap as the wheel bearings, lubricant, etc., become heated. If vent opening 26 is not provided, the pressure buildup in the hubcap 16 could cause the wheel bearings and seals to become damaged. However, the vent opening 26 permits water and other contaminants to enter the interior of the hubcap. To prevent such an undesirable result, the removable plug 28 of this invention has been provided. Plug 28 is conventional in design except for the insert 31 molded therein. Plug 28 is designed to be press-fitted into the opening 26 in the sight glass 20 in conventional fashion. During the manufacture of the plug 28, insert 31 is molded therein. As seen in FIG. 5, insert 31 includes an inner end portion 32, outer end portion 33 and a large cylindrical body portion 36 positioned therebetween. Preferably, insert 31 is comprised of a sintered bronze material but other metal powders cast into the form of the insert may be utilized which permit the passage of air therethrough but which prevent the passage of contaminants such as water therethrough. One type of material that will work for the insert is that which is manufactured by Avenger Metals North, Inc. and which is generally referred to as a 90 P spherical bronze material. Another type of material which will work is that which is known as material grade 153 A and is comprised of 95.5% copper and 4.5% tin. Other suitable materials are sintered stainless steel and aluminum. Preferably, the insert 30 has a density of 17 grams per cubic inch and has a micron rating of 50–130.

Other materials are possible for the insert 31 providing the insert 31 is manufactured from a porous material in which the material, particle size, porosity volume, pore size, pore shape, tortuosity, and interconnection of the pores is such that the plug will readily allow the passage of gasses therethrough but will not allow the passage of fine debris and liquids such as water.

Thus, the plug 28 of this invention may be installed on those prior art hubcaps having the conventional plugs 22 therein without the need of replacing the entire hubcap. Thus it can be seen that a novel means has been provided for venting the interior of a hubcap to prevent damage to the wheel bearings and seals and which prevents the entry of contaminants and water into the interior of the hubcap. It can therefore be seen that the vented plug for a hubcap accomplishes at least all of its stated objectives.

I claim:

1. A plug for a hubcap having an opening formed therein which removably receives the plug, comprising:

said plug having an insert embedded therein which is comprised of a metal material which is impervious to water and other contaminants but which permits the passage of air therethrough to permit the venting of excess pressure from within the hubcap;

said insert including an inner end, an outer end, and an enlarged body portion positioned therebetween.

\* \* \* \* \*